(12) United States Patent
Huh et al.

(10) Patent No.: US 7,499,420 B2
(45) Date of Patent: Mar. 3, 2009

(54) APPARATUS AND METHOD FOR REMOVING SIGNAL INTERFERENCE IN A LOCAL RADIO COMMUNICATION DEVICE MOUNTED IN A MOBILE TERMINAL

(75) Inventors: Jung-Chul Huh, Seoul (KR); Kyong-Joon Chun, Seoul (KR); Joung-Kyou Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 967 days.

(21) Appl. No.: 10/144,176

(22) Filed: May 13, 2002

(65) Prior Publication Data

US 2002/0176385 A1    Nov. 28, 2002

(30) Foreign Application Priority Data

May 11, 2001    (KR) .......................... 10-2001-25789

(51) Int. Cl.
  *H04B 7/216* (2006.01)
(52) U.S. Cl. ...................... 370/320; 370/335; 370/342; 455/417
(58) Field of Classification Search ................... None
  See application file for complete search history.

(56) References Cited

U.S. PATENT DOCUMENTS

| | | | |
|---|---|---|---|
| 6,366,622 B1 * | 4/2002 | Brown et al. ................. | 375/322 |
| 6,574,266 B1 * | 6/2003 | Haartsen ...................... | 375/133 |
| 6,760,319 B1 * | 7/2004 | Gerten et al. ................ | 370/335 |
| 6,816,908 B1 * | 11/2004 | Usmani ....................... | 709/229 |
| 6,868,277 B1 * | 3/2005 | Cerwall et al. .............. | 455/509 |
| 6,931,051 B2 * | 8/2005 | Nafie et al. .................. | 375/136 |
| 2001/0039188 A1 * | 11/2001 | Amereller et al. ........... | 455/417 |

FOREIGN PATENT DOCUMENTS

| | | |
|---|---|---|
| CN | 1120784 | 4/1996 |
| WO | WO 00/51390 | 8/2000 |

* cited by examiner

*Primary Examiner*—Robert W Wilson
(74) *Attorney, Agent, or Firm*—The Farrell Law Firm, PC

(57) ABSTRACT

Disclosed is a method for removing signal interference in a local radio communication device mounted in a mobile terminal. The method comprises receiving information on a channel in use from the mobile terminal in session; determining based on the received channel information whether a harmonic component of a channel frequency used by the mobile terminal belongs to a frequency band used by the local radio communication device; and assigning a channel in a frequency band with none of the harmonic component among the frequency band used by the local radio communication device as a channel of the local radio communication device, when the harmonic component of the channel frequency used by the mobile terminal belongs to the frequency band used by the local radio communication device.

8 Claims, 10 Drawing Sheets

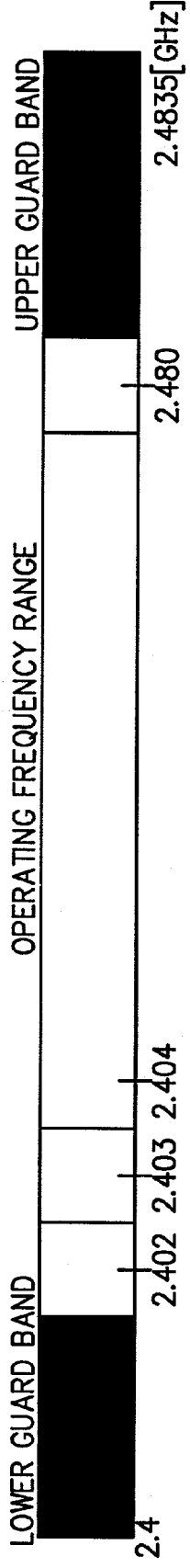
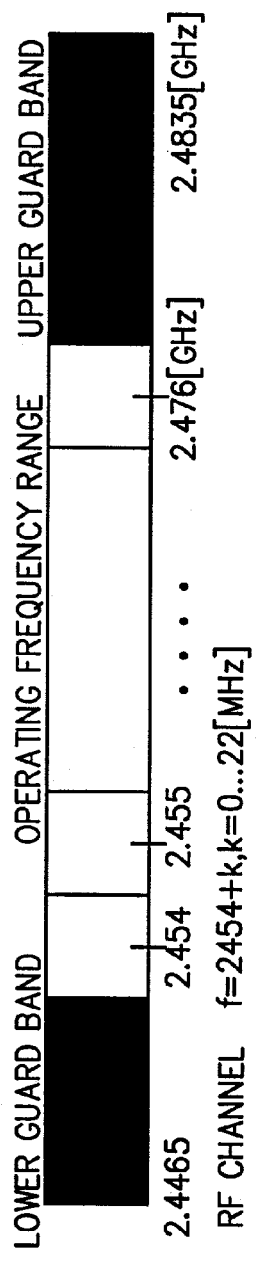
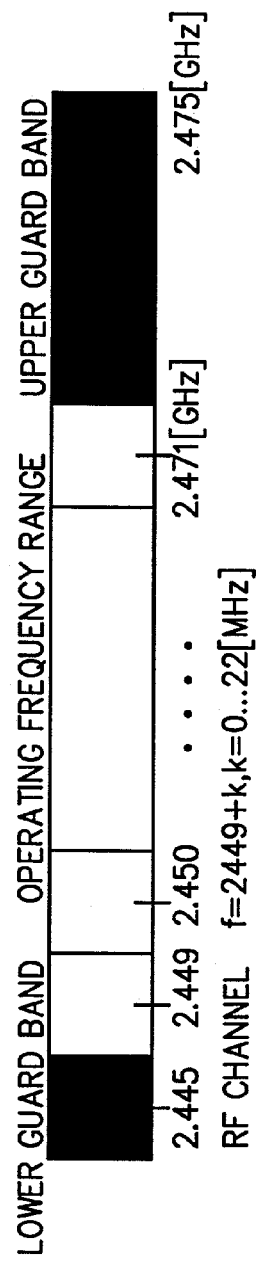
FIG. 1A (A) BLUETOOTH STANDARD FREQUENCY BAND
FIG. 1B (B) OPERATING FREQUENCY BAND IN FRANCE
FIG. 1C (C) OPERATING FREQUENCY BAND IN SPAIN

APPARATUS AND METHOD FOR REMOVING SIGNAL INTERFERENCE IN A LOCAL RADIO COMMUNICATION DEVICE MOUNTED IN A MOBILE TERMINAL

PRIORITY

This application claims priority to an application entitled "Apparatus and Method for Removing Signal Interference in a Local Radio Communication Device Mounted in a Mobile Terminal" filed in the Korean Industrial Property Office on May 11, 2001 and assigned Serial No. 2001-25789, the contents of which are hereby incorporated by reference.

BACKGROUND OF THE INVENTION

1. Field of the Invention

The present invention relates generally to a radio communication system, and in particular, to an apparatus and method for removing signal interference in a Bluetooth radio device mounted in a mobile terminal.

2. Description of the Related Art

Recently, the radio communication and computer industries have become aware that it is possible to realize a radio device and a radio link at a low cost. Such radio device and radio link enable communication between small, portable communication devices, making it possible to remove complicated connection cables between the communication devices. To this end, active research has been carried out. For example, the so-called "Bluetooth" standard has been defined by Ericsson Co., Sweden. The Bluetooth aims to provide mobility to small, short-range radio communication devices, and utility services to business users. The Bluetooth has defined an optimum technical characteristic for the portable computer and communication devices. In particular, the Bluetooth has been designed to provide low-cost, high-efficiency, high-capacity voice and data networking. In a local (or short-range) radio communication system supporting the Bluetooth standard, voice and data can be exchanged in real time between communication devices such as a mobile phone, a notebook computer and a desktop computer, located within a short distance of less than 10 m, through a radio link. The Bluetooth local radio communication system includes a master for transmitting voice/data, and a plurality of slaves for receiving voice/data. The master can be replaced by one of the slaves, and vice versa. That is, the master and the slaves are changeable according to the subject (device) that transmits the voice/data. The radio link defined by the Bluetooth can guarantee information security and prevent interference between information. In addition, the Bluetooth radio device can be manufactured in the form of a microchip, so that it can be easily mounted in the communication devices. Further, the Bluetooth radio device is designed to operate in the (2.4 GHz) band, a worldwide compatible frequency band. The Bluetooth standard specifies two power levels: a low power level for indoor operation and a high power level for inhouse operation. (In-house is defined as a range corresponding to local distance capable of receiving a service. In general, it means a range capable of being serviced within a house or a building of the company. Additionally, indoor indicates a shorter range than that of the in-house, for example, within a room.) The Bluetooth technology supports both point-to-point connection and point-to-multipoint connection. In the case of the point-to-multipoint connection, each master can communicate with a maximum of 7 slaves.

The Bluetooth radio communication system uses an ISM (Industrial, Scientific, Medical) band of 2.4 to 2.4835 GHz, which can be used without government licensing. Since the ISM band used by the Bluetooth radio communication system is open to the public, the Bluetooth radio communication system should be able to tolerate various unpredictable interferences in the ISM band. In order to resolve the interference problem, the Bluetooth radio communication system adopts a frequency hopping spectrum spreading technique. The Bluetooth radio communication system separately supports a 79 hopping technique and a 23 hopping technique, considering a difference in available frequencies of the respective nations. The 79 hopping technique is adopted by certain nations including the U.S. and South Korea, while the 23 hopping technique is adopted by other nations such as Spain.

FIGS. 1A to 1C illustrate a Bluetooth standard frequency band and its RF channels. Referring to FIG. 1A, the Bluetooth standard frequency band ranges from 2.4 to 2.4835 GHz, and 79 1 MHz-bandwidth channels are allocated in the operating frequency range of 2.4015 to 2.4805 GHz. As a result, each of the 79 channels has a center frequency of f=(2402+k)MHz, where k=0, . . . , 78. Specifically, FIG. 1A illustrates a frequency band of the 79 hopping technique and its RF channels.

FIGS. 1B and 1C illustrate frequency bands of the 23 hopping technique and their RF channels. Specifically, FIG. 1B illustrates a frequency band of the 23 hopping technique adopted by France and its RF channels, wherein 23 1 MHz bandwidth channels are allocated in an operating frequency range of 2.4535 to 2.4765 GHz. As a result, each of the 23 channels has a center frequency of f=(2454+k)MHz, where k=0, . . . , 22. Further, FIG. 1C illustrates a frequency band of the 23 hopping technique adopted by Spain and its RF channels, wherein 23 1 MHz-bandwidth channels are allocated in an operating frequency range of 2.4485 to 2.4715 GHz. As a result, each of the 23 channels has a center frequency of f=(2449+k)MHz, where k=0, . . . , 22.

Meanwhile, in a CDMA (Code Division Multiple Access) mobile terminal mounted with a Bluetooth radio device, a part of a third harmonic component of the CDMA transmission frequency belongs to (or overlaps with) the Bluetooth standard frequency band, thus causing interference during the Bluetooth communication. The CDMA transmission frequency provides 20 FAs Frequency assignments) with a channel gap of 1.23 MHz, and third harmonic components of FA=1 and FA=2 frequencies among the 20 FA frequencies belong to the Bluetooth standard frequency band. The FA=1 transmission frequency is 824.640 MHz and the FA=2 transmission frequency is 825.870 MHz. Therefore, as shown in FIG. 2, the third harmonic of the FA=1 transmission frequency is 2473.92 MHz, and the third harmonic of the FA=2 transmission frequency is 2477.61 MHz.

Therefore, the third harmonic of the FA=1 CDMA transmission frequency interferes with a hopping frequency of 2473, 2474 or 2475 MHz (channel center frequency) of the Bluetooth radio device, while the third harmonic of the FA=2 CDMA transmission frequency interferes with a hopping frequency of 2477 and 2478 MHz of the Bluetooth radio device.

SUMMARY OF THE INVENTION

It is, therefore, an object of the present invention to provide an apparatus and method for removing signal interference during Bluetooth communication in a Bluetooth radio device mounted in a mobile terminal.

It is another object of the present invention to provide a method for removing signal interference in a Bluetooth radio device mounted in a CDMA mobile terminal.

To achieve the above and other objects, there is provided a method for removing signal interference in a local radio communication device mounted in a mobile terminal. The method comprises receiving information on a channel in use from the mobile terminal in session; determining based on the received channel information whether a harmonic component of a channel frequency used by the mobile terminal belongs to a frequency band used by the local radio communication device; and assigning a channel in a frequency band with none of the harmonic component among the frequency band used by the local radio communication device as a channel of the local radio communication device, when the harmonic component of the channel frequency used by the mobile terminal belongs to the frequency band used by the local radio communication device.

BRIEF DESCRIPTION OF THE DRAWINGS

The above and other objects, features and advantages of the present invention will become more apparent from the following detailed description when taken in conjunction with the accompanying drawings in which:

FIGS. 1A to 1C illustrate a Bluetooth standard frequency band and its RF channels;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Although the invention will be described with reference to a case where a third harmonic component of a part of the CDMA transmission frequency band overlaps with a frequency for the Bluetooth radio communication, causing signal interference, it will be understood by those skilled in the art that the invention can also be applied to a case where a third harmonic component of a transmission frequency band for other communication systems other than the CDMA system overlaps with the frequency for the Bluetooth radio communication, causing the signal interference.

When the third harmonic component of a part of the CDMA transmission frequency band overlaps with a frequency for the Bluetooth radio communication, signal interference occurs. Thus, the present invention provides three different methods in order to remove the signal interference.

(1) First Method

A Bluetooth radio device receives transmission channel information of a CDMA mobile terminal, and determines whether hopping must be performed at a hopping frequency which overlaps with a third harmonic component of the CDMA transmission channel. If so, the Bluetooth radio device shifts to a hopping frequency adjacent to the overlapped hopping frequency, and performs the hopping at the shifted hopping frequency.

(2) Second Method

The CDMA mobile terminal mounted with the Bluetooth radio device informs a base station of installation of the Bluetooth radio device, so that the base station can assigns channels, excluding FA=1 and FA=2 frequencies which affect the Bluetooth channels. When it is inevitable to assign the FA=1 and FA=2 frefxquencies, the CDMA mobile terminal assigns the FA=1 and FA=2 as late as possible. This method will be described with reference to FIG. 7.

(3) Third Method

The CDMA mobile terminal reduces a magnitude of the third harmonic component of the CDMA transmission frequency by adding a low-pass filter or a band rejection filter in front of a stage for radiating the transmission frequency through an antenna. This method will be described with reference to FIGS. 9A and 9B.

Figure 3:
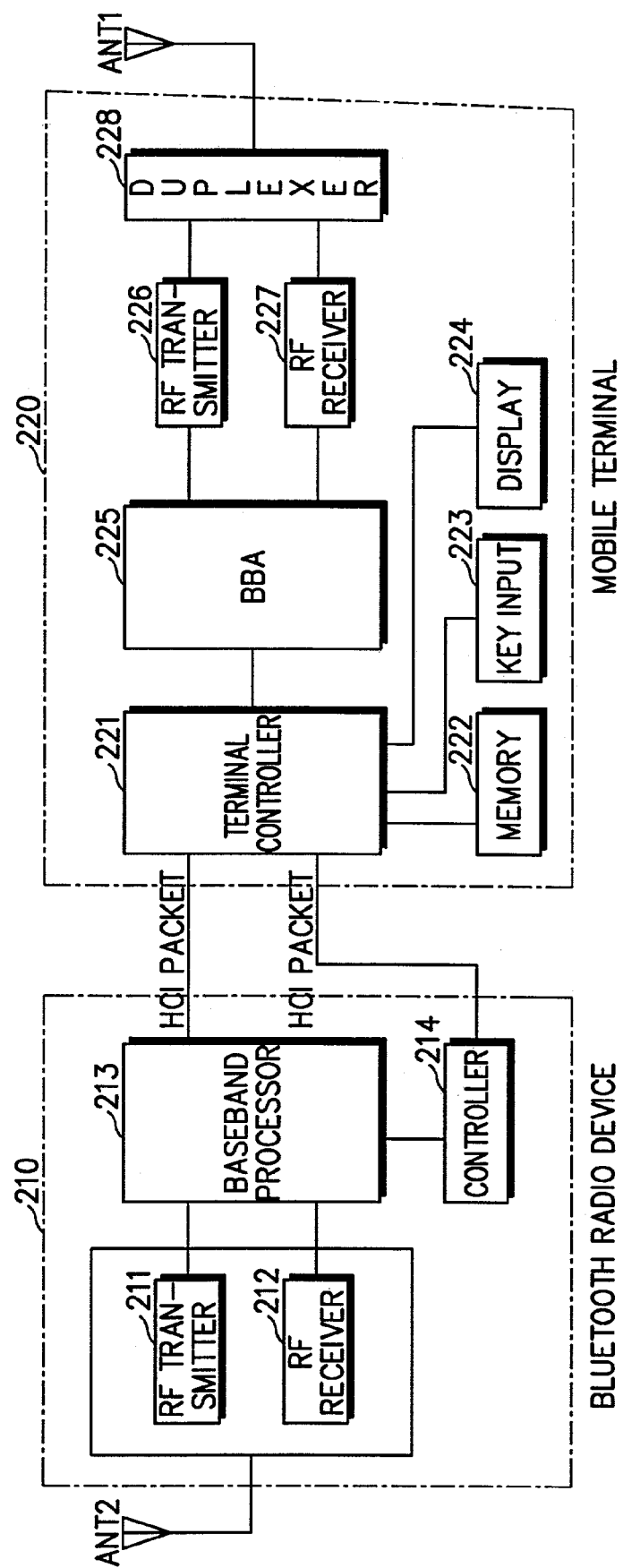
FIG. 3 illustrates a structure of a mobile terminal mounted with a Bluetooth radio device according to an embodiment of the present invention.

FIG. 3 illustrates a structure of a mobile terminal mounted or interfacing with a Bluetooth radio device according to an embodiment of the present invention. In FIG. 3, reference numeral 210 represents a Bluetooth radio device and reference numeral 220 represents a mobile terminal.

Referring to FIG. 3, the Bluetooth radio device 210 includes an RF (Radio Frequency) transmitter 211, an RF receiver 212, a baseband processor 213, a controller 214, and an antenna ANT2. The baseband processor 213 and the controller 214 in the Bluetooth radio device 210 are connected to a terminal controller 221 in the mobile terminal 220 by a host control interface (HCI), and exchange HCI packets including a control command and user data with the mobile terminal 220. The RS232C, USB (Universal Serial Bus), UART (Universal Asynchronous Receiver/Transmitter) and standard PC (Personal Computer) interfaces are generally used for the HCI. The HCI packet is divided into command, event and data packets. The RF transmitter 211 modulates a transmission data packet provided from the baseband processor 213 into an RF signal and amplifies the RF signal before transmission. The RF receiver 212 receives an RF signal, and amplifies the RF signal while suppressing a noise component in the received RF signal. Further, the RF receiver down-converts the amplified RF signal to a baseband signal, and provides the baseband signal to the baseband processor 213. During transmission, the baseband processor 213 adds an access code and a header to an HCI data packet provided from the terminal controller 221 in the mobile terminal 220, converts the HCI data packet to a transmission data packet, and wirelessly transmits the transmission data packet through the RF transmitter 211. During reception, the baseband processor 213 converts a data packet received from the RF receiver 212 to an HCI packet and provides the HCI packet to the terminal controller 221. The controller 214 controls the Bluetooth radio device 210 based on a command packet provided from the terminal controller 221, and provides information output from the baseband processor 213 to the mobile terminal 221 as an HCI packet.

The mobile terminal 220 includes the terminal controller 221, a memory 222, a key input device 223, a display 224, a BBA (Base Band Analog part) 225, an RF transmitter 226, an RF receiver 227, a duplexer 228, and an antenna ANT1. The terminal controller 221 controls the overall operation of the mobile terminal 220. The memory 222 is comprised of a ROM (Read Only Memory) for storing control data and a control program, an EEPROM (Electrically Erasable and Programmable ROM), a non-volatile memory (NVM), for storing telephone numbers and associated names, and a RAM (Random Access Memory) for temporarily storing data generated during execution of the control program. The key input device 223, having a key matrix structure, includes keys for Internet search and data communication and provides the terminal controller 221 with a key input signal according to a key input by the user. The display 224 displays a state related to the data/voice communication and an operating state of the mobile terminal 220, under the control of the controller 221. For reception, the BBA 225 down-converts an IF (Intermediate Frequency) signal to an analog baseband signal, and converts the analog baseband signal to digital data. For transmission, the BBA 225 converts digital data to an analog baseband signal and up-converts the analog baseband signal to an IF signal. The RF transmitter 226 and the RF receiver 227, constituting an RF transceiver, are arranged between the BBA 225 and the duplexer 228. The duplexer 228 provides an RF signal received through the antenna ANT1 to the RF receiver 227, and transmits a modulated RF signal output from the RF transmitter 226 through the antenna ANT1.

If the third harmonic component of a part of the CDMA transmission frequency band overlaps with a frequency for the Bluetooth radio communication, signal interference occurs during the Bluetooth communication. The first method for eliminating the signal interference according to the present invention will be described with reference to FIGS. 4, 5, 6, and 8.

(1) First Method

A Bluetooth radio device receives transmission channel information of a CDMA mobile terminal, and determines whether hopping must be performed at a hopping frequency which overlaps with a third harmonic component of the CDMA transmission channel. If so, the Bluetooth radio device shifts to a hopping frequency adjacent to the overlapped hopping frequency, and performs the hopping at the shifted hopping frequency. This method will be described with reference to FIGS. 4 to 6 and 8.

Figure 4:
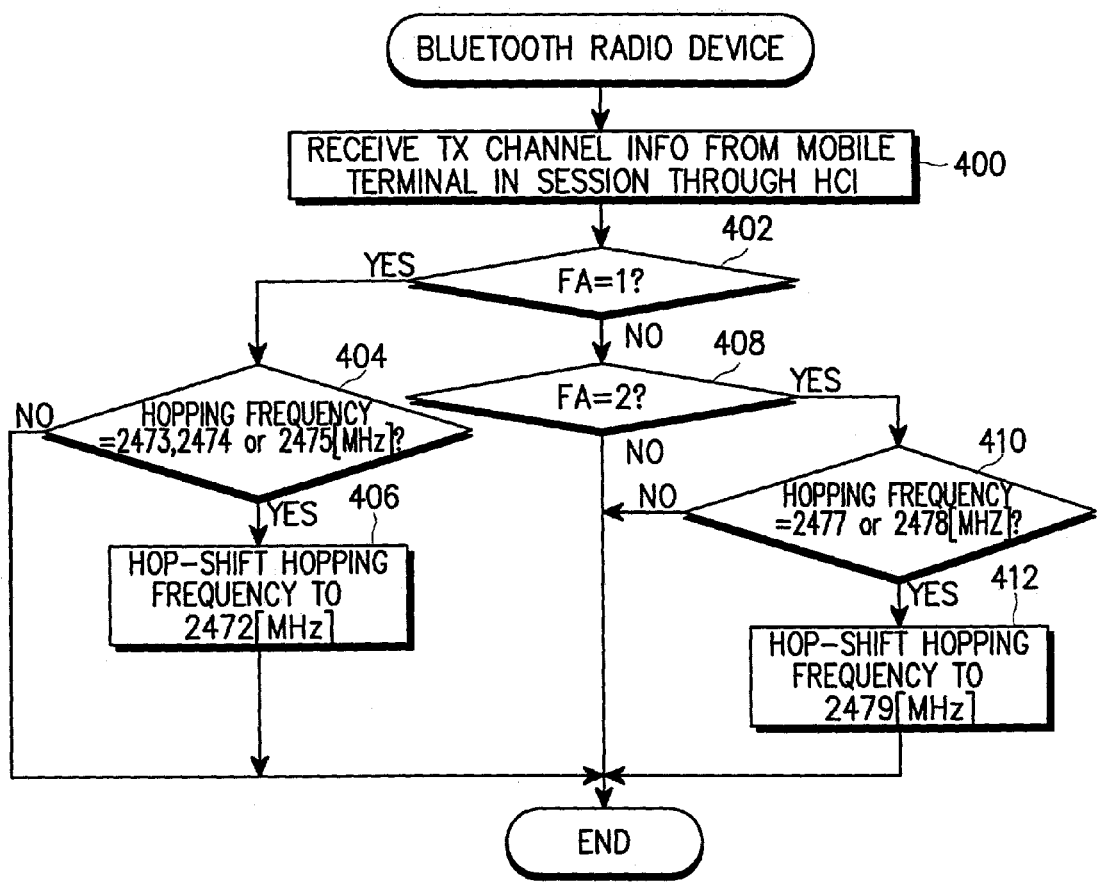
FIG. 4 illustrates a procedure for generating a hopping frequency in a 79 hopping mode by the Bluetooth radio device in order to remove signal interference occurring during Bluetooth communication according to an embodiment of the present invention.
Figure 5:
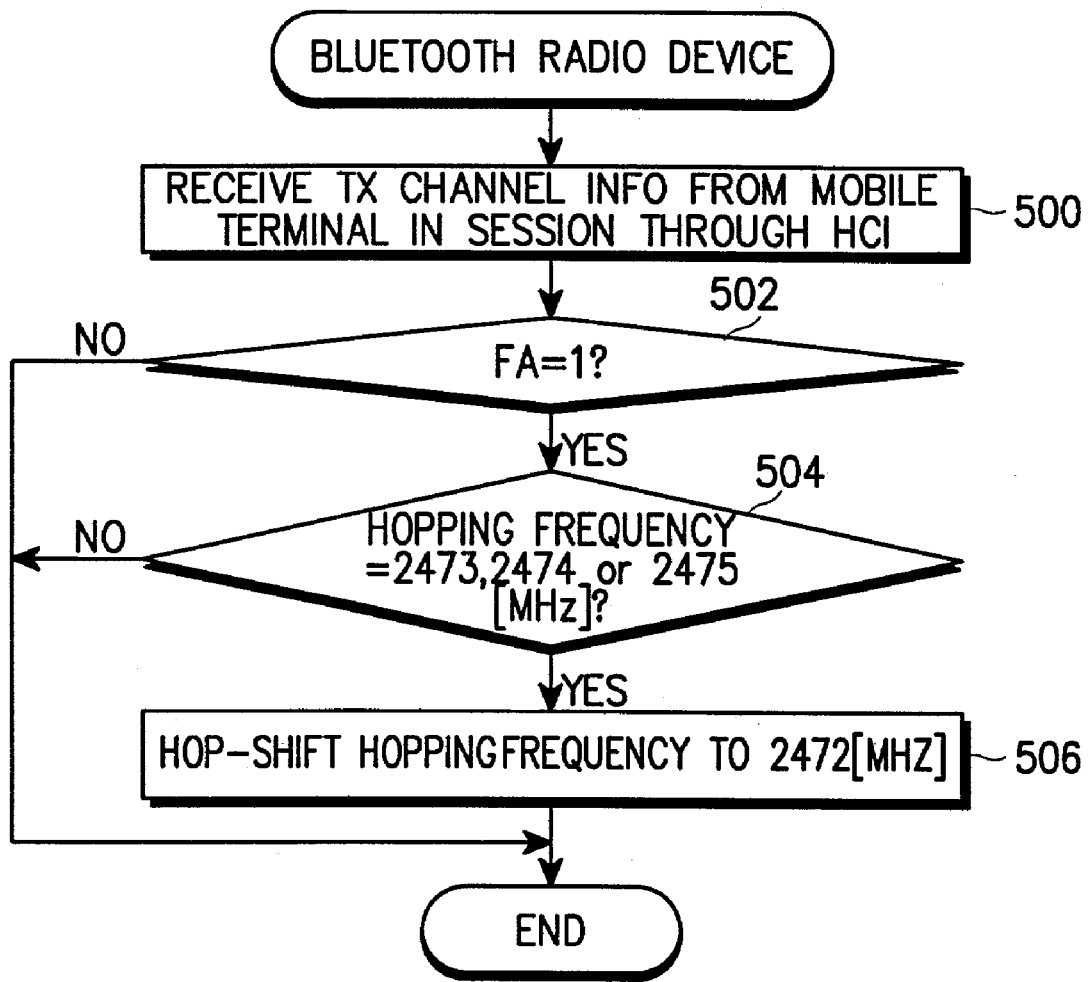
FIG. 5 illustrates a procedure for generating a hopping frequency in a 23 hopping mode by the Bluetooth radio device in order to remove signal interference occurring during Bluetooth communication according to an embodiment of the present invention.

FIG. 4 illustrates a procedure for generating a hopping frequency in a 79 hopping mode by the Bluetooth radio device 210 in order to remove signal interference occurring during Bluetooth communication according to an embodiment of the present invention. FIG. 5 illustrates a procedure for generating a hopping frequency in a 23 hopping mode by the Bluetooth radio device 210 in order to remove signal interference occurring during Bluetooth communication according to an embodiment of the present invention.

In order to hop at an interference-free frequency during Bluetooth communication, the Bluetooth radio device 210 must acquire channel information of the transmission frequency of the mobile terminal 220 mounted with the Bluetooth radio device 210. Therefore, the Bluetooth radio device 210 receives information on the transmission channel of the mobile terminal 220. To this end, the terminal controller 221 of the mobile terminal 220 exchanges information with the controller 214 in the Bluetooth radio device 210 through HCI (Host Controller Interface; see Bluetooth Specification Version 1.0A, p.516). The HCI includes UART and USB.

Figure 6:
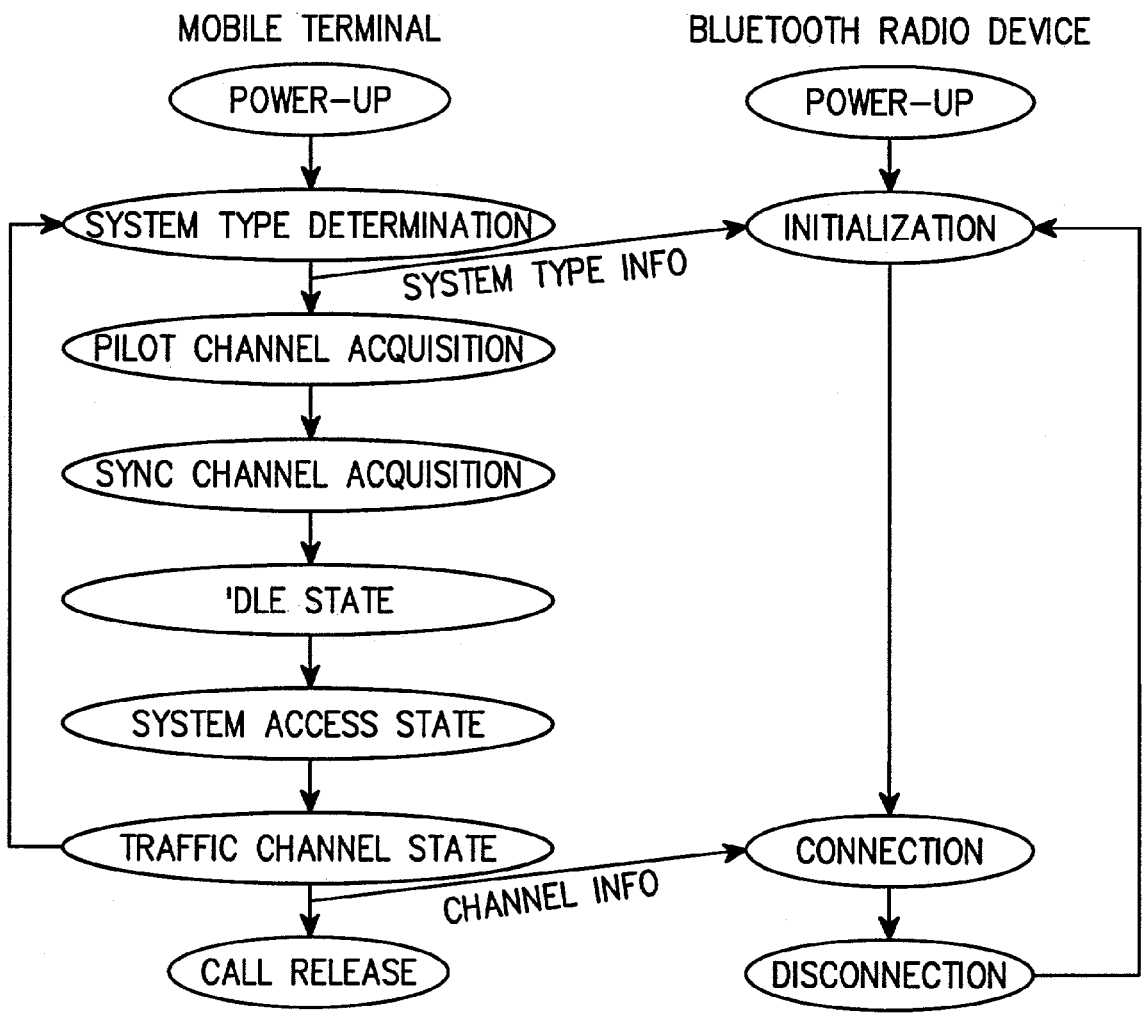
FIG. 6 illustrates a state transition diagram for explaining a procedure for exchanging information between the Bluetooth radio device and the mobile terminal according to an embodiment of the present invention.

FIG. 6 illustrates a state transition diagram for explaining a procedure for exchanging information between the Bluetooth radio device 210 and the mobile terminal 220 through the HCI according to an embodiment of the present invention. Referring to FIG. 6, the mobile terminal 220 determines a system type of the terminal upon power-up. In the embodiment of the present invention, the mobile terminal 220 provides system type information indicating its system type to the Bluetooth radio device 210 through the HCI. The reason for transmitting the system type information is because it is not necessary to consider a GSM (Group Special Mobile, or Global System for Mobile telecommunications) terminal, since it does not affect the Bluetooth communication. Meanwhile, since an AMPS (Advanced Mobile Phone Service) system also uses nearly the same frequency as the CDMA system, the mobile terminal 220 is able to provide the Bluetooth radio device 210 with the system type information through the HCI. However, since the AMPS system is not used as widely as the CDMA system and the GSM system, the AMPS system will not be considered in the embodiment of the present invention, for simplicity.

The controller 214 in the Bluetooth radio device 210 receives the system type information provided from the mobile terminal 220 through the HCI in its initialization state after power-up. The Bluetooth radio device 210 recognizes the system type, i.e., whether the mobile terminal 220 is a CDMA terminal or GSM terminal, based on the system type information. Thereafter, the Bluetooth radio device 210 may perform connection and disconnection.

After determining the system type, the mobile terminal 220 may transition to a pilot channel acquisition state, a synchronous channel acquisition state, an idle state, a system access state, a traffic channel state and a call release state, as further illustrated in FIG. 6. In the embodiment of the present invention, the mobile terminal 220 transmits its transmission channel information to the Bluetooth radio device 210 through the HCI during a call, i.e., in the traffic channel state. The Bluetooth radio device 210 receives the transmission channel information of the mobile terminal 220 from the mobile terminal 220 in session through the HCI in step 400 of FIG. 4 and step 500 of FIG. 5. Upon receiving the transmission channel information of the mobile terminal 220 in session, the Bluetooth radio device 210 generates a new hopping frequency by performing step 402 of FIG. 4 or 502 of FIG. 5 according to the hopping mode.

With continued reference to the 79 hopping mode of FIG. 4, after receipt of the transmission channel information of the mobile terminal 220, the Bluetooth radio device 210 determines in step 402 whether the FA of the CDMA transmission channel of the mobile terminal 220 in session is FA=1. If FA=1, the Bluetooth radio device 210 hop-shifts the hopping frequency of 2473, 2474 or 2475 MHz to another hopping frequency by performing steps 404 and 406. In the embodiment of the present invention, the Bluetooth radio device 210 hop-shifts to a hopping frequency of 2472 MHz. If FA≠1 in step 402, the Bluetooth radio device 210 determines in step 408 whether FA=2. If FA=2, the Bluetooth radio device 210 hop-shifts the hopping frequency of 2477 or 2478 MHz to another hopping frequency by performing steps 410 and 412. In the embodiment of the present invention, the Bluetooth radio device 210 hop-shifts to a hopping frequency of 2479 MHz. The hopping frequencies, as well known in the art, are created by a selection box of the controller 214 by receiving UAP/LAP (Upper Address Part/Lower Address Part) of a BD (Bluetooth Device) address and a master clock.

With reference to the 23 hopping mode of FIG. 5, after receipt of the transmission channel information of the mobile terminal 220, the Bluetooth radio device 210 determines in step 502 of FIG. 5 whether FA of the CDMA transmission channel of the mobile terminal 220 in session is FA=1. If FA=1, the Bluetooth radio device 210 hop-shifts the hopping frequency of 2743, 2744 or 2745 MHz to another frequency by performing steps 504 and 506. In the embodiment of the present invention, the Bluetooth radio device 210 hop-shifts to a hopping frequency of 2472 MHz.

When the Bluetooth radio device 210 mounted in the mobile terminal 220 hops at an interference-free frequency during Bluetooth communication as stated above, the Bluetooth radio device 210 informs other Bluetooth radio devices of the hop-shifting.

Figure 8:
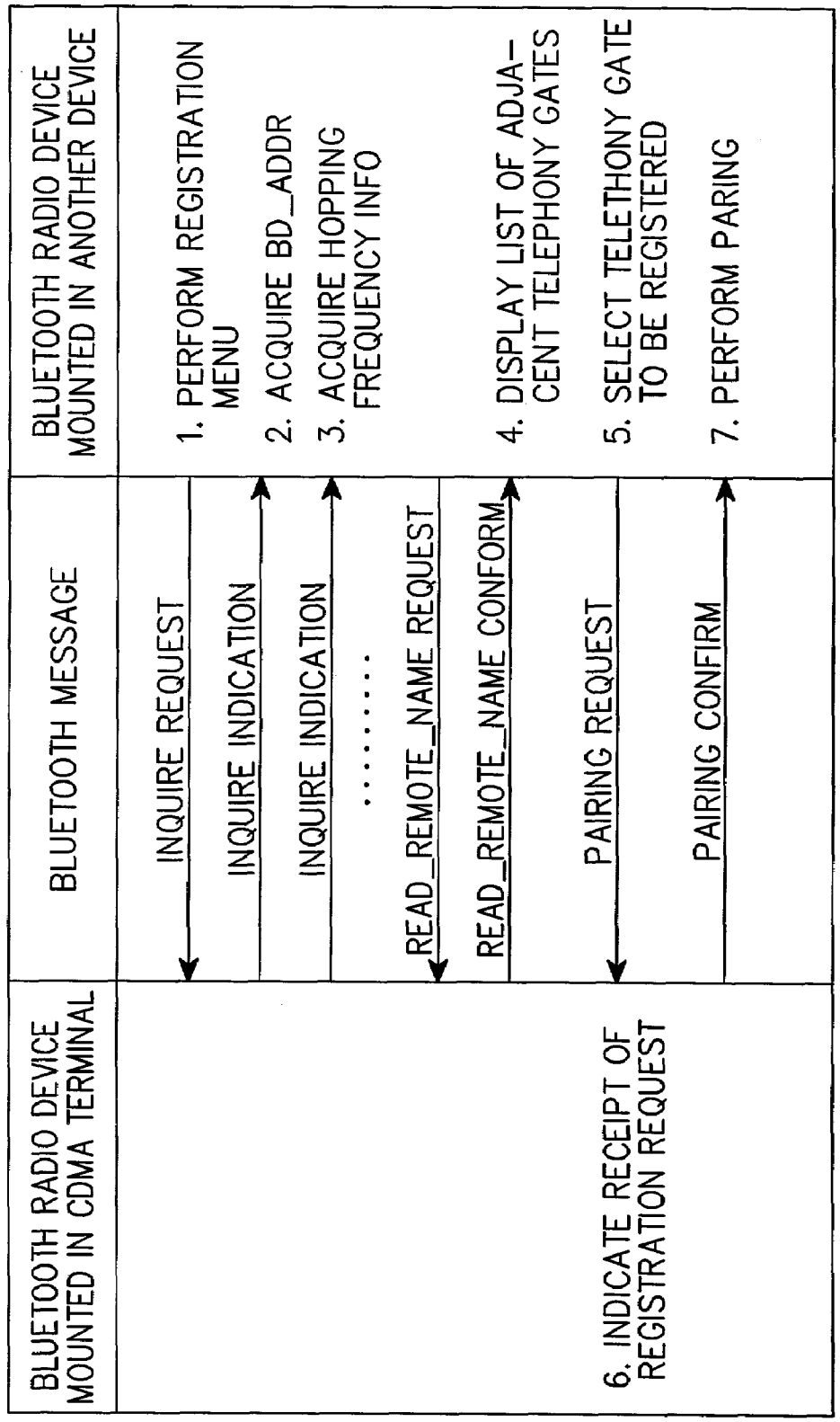
FIG. 8 illustrates a protocol for message exchange between the Bluetooth radio device mounted in the mobile terminal and the Bluetooth radio device mounted in another device according to an embodiment of the present invention.

FIG. 8 illustrates a protocol for message exchange between the Bluetooth radio device 210 mounted in the mobile terminal 220 and the Bluetooth radio device mounted in another device according to an embodiment of the present invention. For example, the "another device" includes a personal computer (PC), a notebook PC, a printer and home appliances, including another mobile terminal mounted with the Bluetooth radio device.

A message exchange operation between two Bluetooth radio devices will be described herein below by way of example. Upon receiving an Inquiry Request message by a registration request of a Bluetooth radio device mounted in another device, the Bluetooth radio device 210 mounted in the mobile terminal 220 continuously transmits an Inquiry Indication message to the Bluetooth radio device mounted in another device. The Bluetooth radio device mounted in another device acquires Bluetooth device address BD_ADDR of the Bluetooth radio device 210, and then performs hopping by acquiring hopping frequency information using the information. As described above, the Bluetooth radio device 210 mounted in the mobile terminal 220 performs new hopping (or hop-shifting) in order to avoid signal interference during Bluetooth communication, caused by the third harmonic component of the CDMA transmission channel, and provides the new hopping information to the Bluetooth radio device mounted in the other device in the Inquiry Indication process. Then, the hopping between the Bluetooth radio device 210 in the mobile terminal 220 and the Bluetooth radio device in another device is performed avoiding signal interference due to the third harmonic component of the CDMA transmission channel frequency.

The procedure performed in the processes #4 to #7 of FIG. 8 is a general procedure performed between the Bluetooth radio devices to recognize nearby Bluetooth devices. In this procedure, the Bluetooth radio device mounted in another device transmits a Read_Remote_Name_Request message to the Bluetooth radio device 210 mounted in the mobile terminal 220. Upon receiving the Read_Remote_Name_Request message, the Bluetooth radio device 210 transmits a Read_Remote_Name_Confirm message to the Bluetooth radio device mounted in another device. As a result, the Bluetooth radio device mounted in another device acquires a Remote Name of the Bluetooth radio device 210 mounted in the mobile terminal 220. In general, the Bluetooth radio devices have their own unique BD addresses, but cannot recognize the type of the other device, so that the user gives a unique Remote Name to each Bluetooth radio device. For example, when an IP (Internet Protocol) address in a computer network corresponds to the BD address BD_ADDR, a computer name corresponds to the Remote Name. By acquiring the Remote Name, the Bluetooth radio device recognizes a list of Telephony Gates found in the vicinity of the Bluetooth radio device. Thereafter, the two Bluetooth radio devices are subject to pairing by exchanging a Paring Request message and a Pairing Confirm message.

Figure 2:
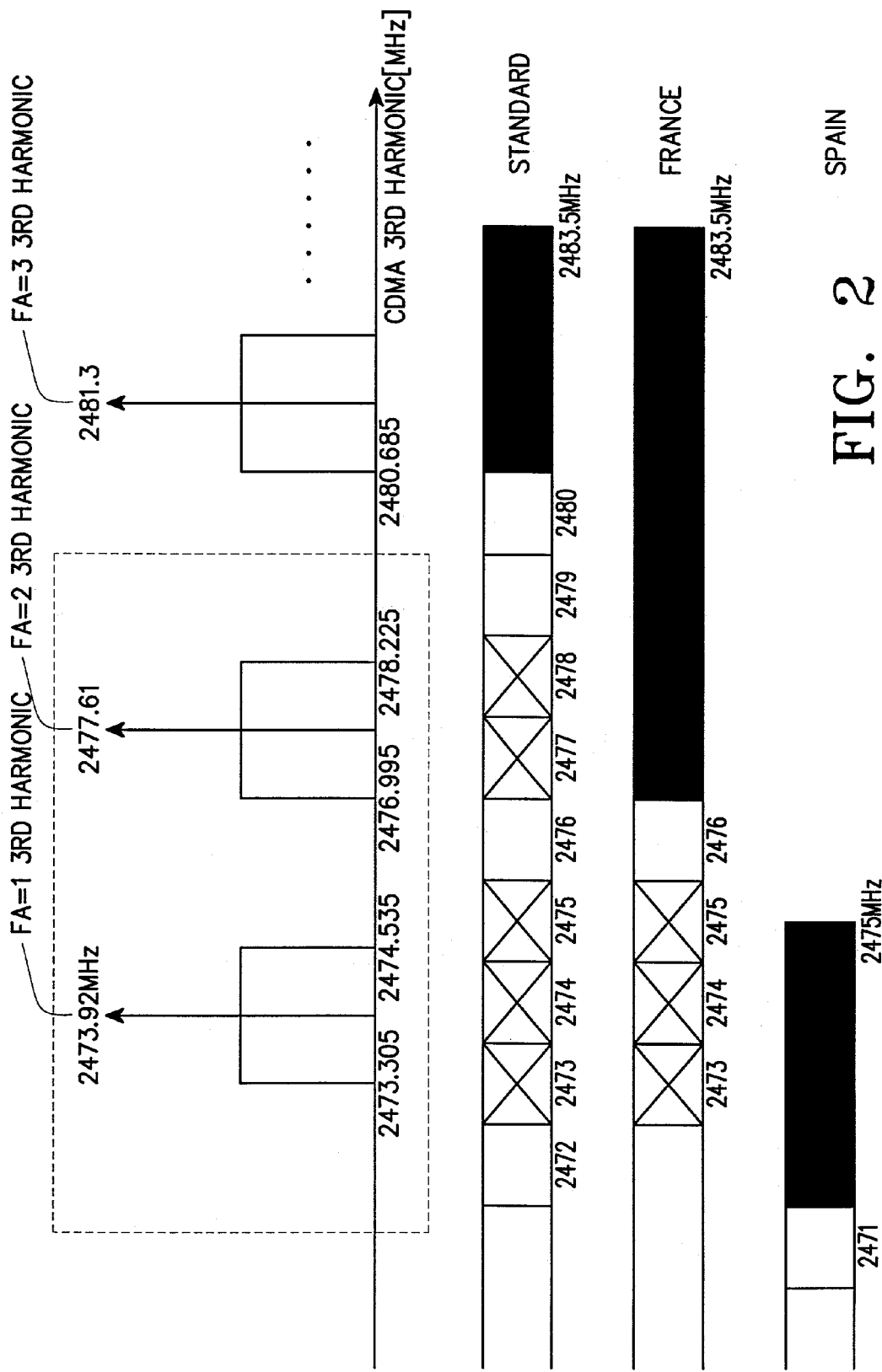
FIG. 2 illustrates that a third harmonic component of a CDMA transmission frequency partially belongs to a Bluetooth standard frequency band.

In FIG. 2, "X" represents the channels interfering with the hopping frequency. Therefore, the Bluetooth radio device 210 performs Bluetooth communication using the hopping frequency channels excluding the interference channels.

(2) Second Method

The CDMA mobile terminal mounted with the Bluetooth radio device informs a base station of installation of the Bluetooth radio device, so that the base station can assign channels, excluding FA=1 and FA=2 frequencies which principally affect the Bluetooth channels. In this case the Bluetooth radio device has no interference from the third harmonic component of the CDMA transmission channel. Thus there is no need for rejecting the interference. However if the base station inevitably must assign the FA=1 and FA=2 frequencies to the CDMA mobile terminal, the CDMA mobile terminal is then able to transmit using the FA=1 or FA=2 frequencies. In this case the Bluetooth radio device takes into account interference of the third harmonic component of the CDMA transmission channel by applying a hopping method, such as in the above first method or the below third method. Thus there is need to reject the interference. That is, the second method aims to use frequencies other than the hopping frequencies existing in a position where the third harmonic component of a part of the CDMA transmission frequency band overlaps with the frequency for the Bluetooth communication. For example, the Bluetooth radio communication system supporting the 79 hopping technique uses a 71 hopping technique excluding a frequency band of from 2473 to 2480 MHz including 2473, 2474, 2475, 2477 and 2478 MHz, which are affected by signal interference. Further, the Bluetooth radio communication system supporting the 23 hopping technique uses a 19 hopping technique excluding a frequency band of from 2473 to 2476 MHz, since the frequencies of 2473, 2474 and 2475 MHz are affected the signal interference.

Figure 7:
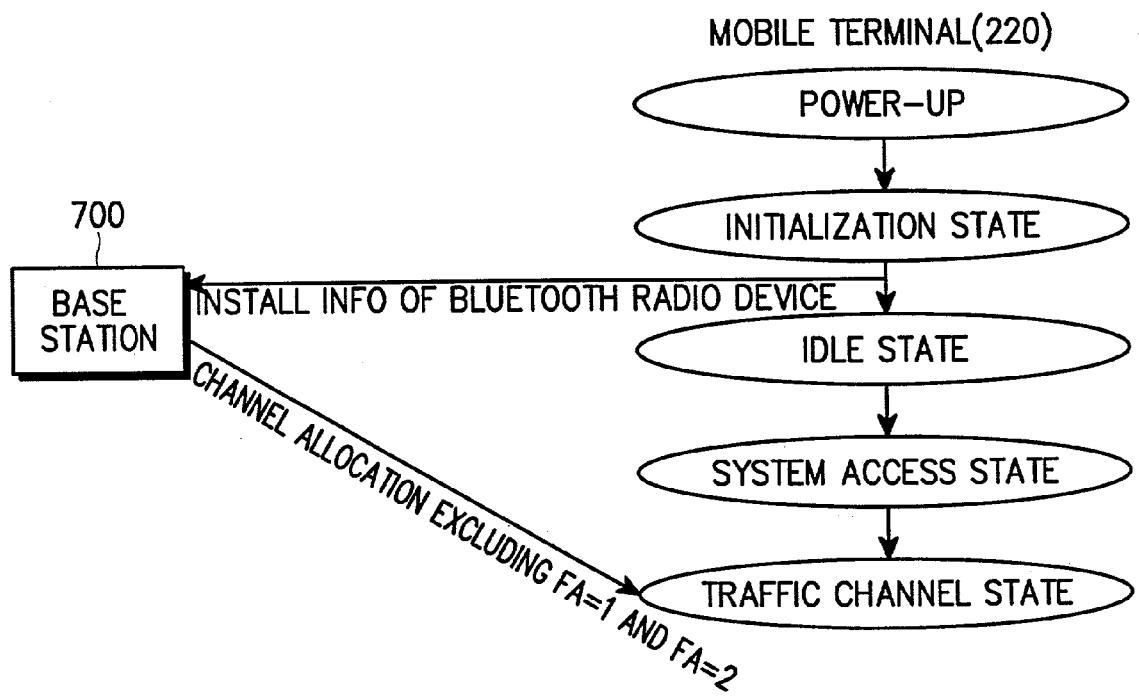
FIG. 7 illustrates a state transition diagram for explaining a process in which a mobile terminal informs a base station of installation of the Bluetooth radio device, and then is assigned a transmission channel from the base station.

FIG. 7 illustrates a state transition diagram for explaining a process in which a CDMA mobile terminal 220 informs a base station 700 of installation of the Bluetooth radio device, and then is assigned a transmission channel (excluding FA=1 and FA=2 frequencies) from the base station 700. The second method will be described with reference to FIG. 7.

In FIG. 7, the right-hand side procedure is performed by the mobile terminal 220, while the left-hand side procedure is performed by the base station 700. After power-up, the mobile terminal 220 informs the base station 700 of installation of the Bluetooth radio device in an initialization state. The base station 700 then assigns a channel to the mobile terminal 220 excluding the FA=1 and FA=2 frequencies which may interfere with the Bluetooth radio device. After the initialization state, the mobile terminal 220 may transition to an idle state, a system access state and a traffic channel state. In the traffic channel state, the mobile terminal 220 communicates with the other party's mobile subscriber through the channel (excluding the FA=1 and FA=2 frequencies) assigned by the base station 700.

(3) Third Method

Figure 9A:
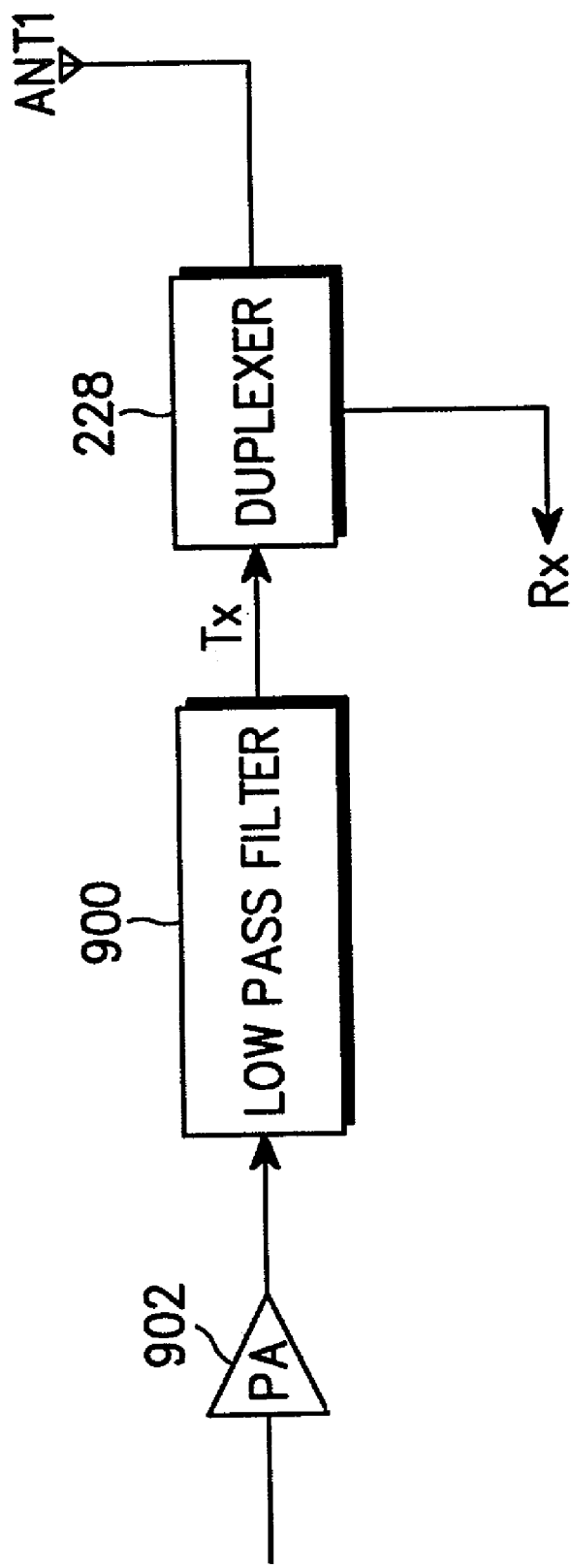
FIGS. 9A and 9B illustrate a structure of a mobile terminal transmitter including a filter arranged in a preceding stage of an antenna in order to remove the third harmonic component of the mobile terminal's transmission frequency, which causes signal interference during the Bluetooth communication.
Figure 9B:
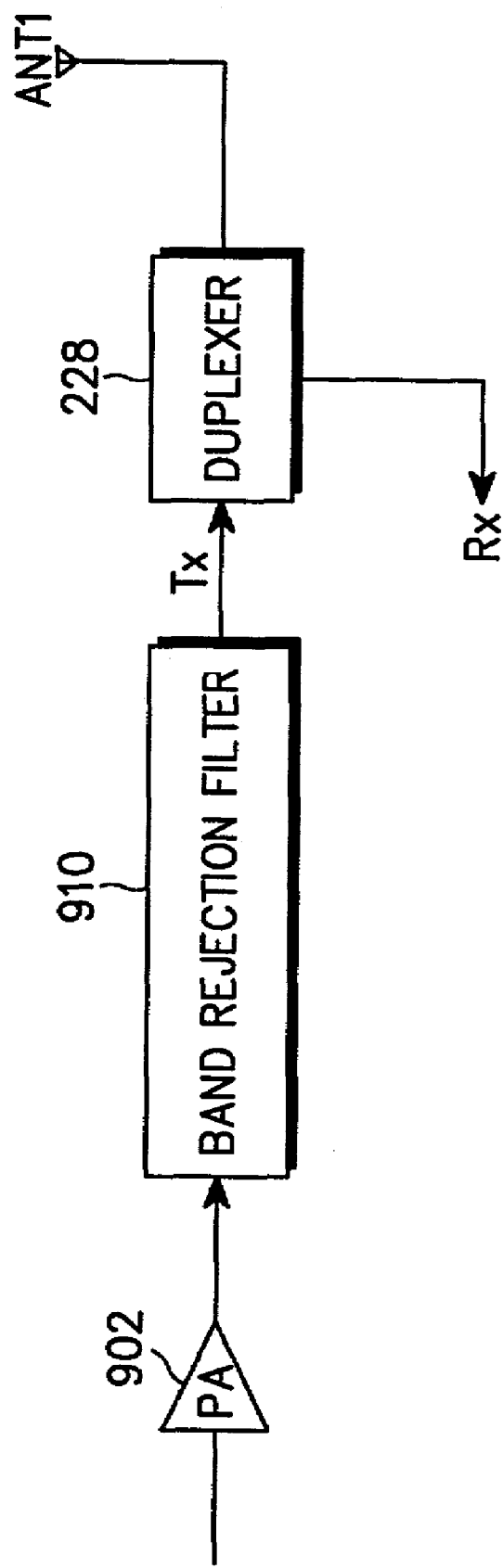

The CDMA mobile terminal reduces a magnitude of the third harmonic component of the CDMA transmission frequency by adding a low-pass filter or a band rejection filter in front of a stage for radiating the transmission frequency through an antenna. FIGS. 9A and 9B illustrate a structure of a mobile terminal transmitter including a filter arranged in a preceding stage of an antenna in order to remove the third harmonic component of the mobile terminal's transmission frequency, which causes signal interference during the Bluetooth communication. Referring to FIG. 9A, a low-pass filter 900 for removing the third harmonic component of the FA=1 and FA=2 transmission frequencies of the CDMA mobile terminal is interposed between a power amplifier (PA) 902 and a duplexer 228 in the transmitter of the CDMA mobile terminal. The low-pass filter 900 passes frequencies lower than the third harmonic component frequency of the FA=1 and FA=2 frequencies, which causes the signal interference during the Bluetooth communication. Referring to FIG. 9B, a band rejection filter 910 for rejecting the third harmonic component of the FA=1 and FA=2 transmission frequencies of the CDMA mobile terminal, which causes signal interference during the Bluetooth communication, is interposed between the power amplifier (PA) 902 and the duplexer 228 in the transmitter of the CDMA mobile terminal. By providing the low-pass filter 900 or the band rejection filter 910, the third harmonic component of the FA=1 and FA=2 transmission frequencies of the mobile terminal is rejected, thus removing the signal interference during the Bluetooth communication.

As an alternative method, a duplexer having a good attenuation characteristic for power of the third harmonic component of the FA=1 and FA=2 transmission frequencies for the CDMA mobile terminal is used as the duplexer for splitting the transmission signals from the reception signals. That is, the duplexer 228 connected to the antenna ANT1 is designed to have an attenuation characteristic capable of removing the third harmonic component of the transmission frequency for the mobile terminal, which causes signal interference during the Bluetooth communication. The attenuation characteristic of the duplexer according to an embodiment of the present invention will be described in detail herein below. Commonly, maximum transmission power of the CDMA power amplifier 902 is about 28 dBm, and power of the third harmonic component of the transmission frequency from the CDMA power amplifier 902 is 30 dBc in the worst case and normally 35 to 40 dBc. Therefore, in the worst case, the power of the third harmonic component becomes −2 dBm (=28 dBm-30 dBc). Thereafter, the duplexer 228 attenuates transmission power of the third harmonic component by about 5 to 10 dBm. As a result, the transmission power of the third harmonic component of about −7 to −12 dBm (=−2 dBm-(5 to 10 dBm) is transmitted through the antenna ANT1, thus causing an influence on the Bluetooth communication. However, according the Bluetooth radio specifications, power of a reference input signal should be about −70 dBm, and when a signal is larger than the reference input signal by 10 dBm (i.e., −60 dBm), performance for co-channel interference is required within 11 dB. As a result, the third harmonic component permits only a signal of less than −71 dBm. Therefore, in the embodiment of the present invention, the duplexer attenuates the third harmonic component by at least 70 dBm. It is difficult to design a duplexer capable of attenuating the third harmonic component by more than 70 dBm. However, it is preferable that the duplexer is designed to reduce the third harmonic component as much as possible without affecting an in-band signal in order to remove interference due to the third harmonic component of the transmission frequency. By doing so, it is possible to remove an influence of third harmonic component of the FA=1 and FA=2 transmission frequencies for the CDMA mobile terminal, even without using the low-pass filter 900 or the band rejection filter 910.

As described above, the present invention can perform the Bluetooth communication between Bluetooth radio devices without signal interference, even when the third harmonic component of a part of the CDMA transmission frequency overlaps with a frequency for the Bluetooth communication.

While the invention has been shown and described with reference to a certain preferred embodiment thereof, it will be understood by those skilled in the art that various changes in form and details may be made therein without departing from the spirit and scope of the invention as defined by the appended claims. For example, the next generation Bluetooth communication system will raise its operating frequency range in order to increase a data rate. If the 5 GHz-ISM band (5.725 to 5.825 GHz) is used as the operating frequency band for the Bluetooth communication, the operation frequency band of about 5.725 to 5.825 GHz may partially overlap with a third harmonic component band (5760 to 5940 MHz) of a transmission frequency band (1920 to 1980 MHz) of the third generation mobile communication system. Therefore, the third generation mobile communication system may also interfere with the Bluetooth communication of 5 GHz-ISM band due to the third harmonic component of its transmission frequency band. In such a case, the present invention can be applied.

What is claimed is:

1. A method for removing signal interference, the method comprising the steps of:
   receiving information of an occupied channel from a mobile terminal in session;
   determining based on the received channel information whether a harmonic component of the occupied channel frequency used by the mobile terminal belongs to a frequency band used by a first local radio communication device mounted in a mobile terminal; and
   assigning a channel in a frequency band with none of the harmonic component among the frequency band used by the first local radio communication device to communicate with a second local radio communication device, when the harmonic component of the channel frequency used by the mobile terminal belongs to the frequency band used by the first local radio communication device.

2. The method as claimed in claim 1, wherein the assigned channel for the first local radio communication device is a neighbor channel excluded from the frequency band in which a harmonic component of the channel frequency used by the mobile terminal is included.

3. The method as claimed in claim 1, wherein the harmonic component is a third harmonic component.

4. The method as claimed in claim 1, wherein the channel information of the mobile terminal is transmitted by the mobile terminal in a traffic channel state of the mobile terminal.

5. The method as claimed in claim 1, wherein information on the channel assigned to the first local radio communication device is transmitted to other devices in radio communication with the first local radio communication device.

6. The method as claimed in claim 5, wherein the information on the channel assigned to the first local radio communication device is transmitted to the other devices, while transmitting an Inquiry Indication message of the first local radio communication device in response to an Inquiry Request message from the other devices.

7. A method for removing signal interference in a Bluetooth radio device mounted in a CDMA (Code Division Multiple Access) mobile terminal, comprising the steps of:
   receiving information on a channel in use from the CDMA mobile terminal in session;

determining whether a third harmonic component of the occupied channel frequency of the CDMA mobile terminal in session overlaps with a hopping frequency where the Bluetooth radio device is to hop; and hop-shifting to a hopping frequency different from the overlapped hopping frequency, when the third harmonic component overlaps with the hopping frequency.

8. A method for removing signal interference in a Bluetooth radio device mounted in a mobile terminal, comprising the steps of:

informing, by the mobile terminal, a base station of whether the Bluetooth radio device is mounted in the mobile terminal, in an initialization process of the mobile terminal;

determining, by the base station based on received information of whether the Bluetooth radio device is mounted, whether a harmonic component of a channel frequency being capable of being assigned to the mobile terminal belongs to a frequency band used by the Bluetooth radio device, and assigning the mobile terminal a channel excluding a frequency causing interference to the Bluetooth radio device; and setting up a call between the mobile terminal and another mobile terminal in a traffic state using the channel assigned by the base station, excluding the frequency causing interference to the Bluetooth radio device.

* * * * *